(12) United States Patent
Karasawa (10) Patent No.: US 8,429,972 B2
(45) Date of Patent: Apr. 30, 2013

(54) ULTRASONIC IMAGING APPARATUS

(75) Inventor: Hirokazu Karasawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 419 days.

(21) Appl. No.: 12/748,960

(22) Filed: Mar. 29, 2010

(65) Prior Publication Data

US 2010/0242610 A1    Sep. 30, 2010

(30) Foreign Application Priority Data

Mar. 30, 2009  (JP) .................................. 2009-081459

(51) Int. Cl.
G01N 29/06       (2006.01)
(52) U.S. Cl.
USPC ............................................. 73/602; 702/39
(58) Field of Classification Search .................... 73/602, 73/624, 625, 626, 628; 702/39
See application file for complete search history.

(56) References Cited

U.S. PATENT DOCUMENTS

| | | | |
|---|---|---|---|
| 4,688,045 A | | 8/1987 | Knudsen |
| 5,322,068 A | * | 6/1994 | Thiele et al. .................. 600/447 |
| 5,383,366 A | | 1/1995 | Wallingford et al. |
| 5,537,875 A | | 7/1996 | Viehmann et al. |
| 7,388,810 B2 | * | 6/2008 | Campbell ........................ 367/99 |
| 2003/0236461 A1 | | 12/2003 | Poland |
| 2006/0241429 A1 | * | 10/2006 | Ustuner et al. ................. 600/437 |
| 2009/0234230 A1 | * | 9/2009 | Bercoff et al. ................. 600/447 |

FOREIGN PATENT DOCUMENTS

| | | |
|---|---|---|
| EP | 1 645 873 A1 | 4/2006 |
| JP | 2000-028589 A | 1/2000 |

OTHER PUBLICATIONS

European Search report, mailed Jul. 12, 2010.*
Chinese Office Action and English Translation, dated Jul. 25, 2011, 19 pages.

* cited by examiner

*Primary Examiner* — Peter Macchiarolo
*Assistant Examiner* — Rose M Miller
(74) *Attorney, Agent, or Firm* — Foley & Lardner LLP (57) ABSTRACT

There is provided an ultrasonic imaging apparatus capable of efficiently generating an image both by using a transmission ultrasonic wave with a wide angle of beam spread and by using a transmission ultrasonic wave with a narrow angle of beam spread. The ultrasonic imaging apparatus includes: a transmission control part controlling transmission timings of a plurality of first piezoelectric elements so as to make a synthesized wave of ultrasonic waves transmitted from the plural first piezoelectric elements match an ultrasonic wave transmitted from a predetermined virtual transmission point; a signal detecting circuit detecting an electric signal corresponding to an ultrasonic echo transmitted from the plural first piezoelectric elements, reflected by an inspection target, and received by a plurality of second piezoelectric elements; and a generating part generating an image corresponding to the inspection target based on the electric signal.

11 Claims, 6 Drawing Sheets

ULTRASONIC IMAGING APPARATUS

CROSS-REFERENCE TO RELATED APPLICATIONS

This application is based upon and claims the benefit of priority from the prior Japanese Patent Application No. 2009-081459, filed on Mar. 30, 2009; the entire contents of which are incorporated herein by reference.

BACKGROUND OF THE INVENTION

1. Field of the Invention

The present invention relates to an ultrasonic imaging apparatus imaging an inspection target by using an ultrasonic wave.

2. Description of the Related Art

For example, an ultrasonic imaging apparatus for medical use and so on generates an image by using pencil beams (ultrasonic beams with a narrow angle of beam spread) generated by two-dimensional or three-dimensional scanning of a microscopic piezoelectric element. In order to generate a three-dimensional image here, the scanning has to be repeated in a three-dimensional space an enormously large number of times such as several hundred times to several thousand times, for instance.

Meanwhile, there has been developed a method for generating an image by transmitting ultrasonic waves with a wide angle of beam spread from piezoelectric elements arranged in matrix and applying aperture synthesis to received echo signals. An ultrasonic wave is transmitted from one of the piezoelectric elements as a transmission point and is received by the other piezoelectric elements. The transmission and reception are repeated approximately several ten times while the transmission point is changed, so that a three-dimensional image can be generated.

Here, when ultrasonic waves with a wide angle of beam spread are transmitted from the piezoelectric elements, there is a limit to improvement in resolution of an ultrasonic wave image. In the aperture synthesis, resolution is higher as the transmission/reception angle of beam spread of the ultrasonic waves is wider. To widen the angle of beam spread, the piezoelectric elements need to be made smaller. However, size reduction of the piezoelectric elements results in lower sensitivity, which may lower the resolution of an ultrasonic image all the more.

As a solution, there has been proposed an ultrasonic imaging apparatus that causes the transmission of an ultrasonic wave from one virtual point sound source by controlling the transmission timings of ultrasonic waves from a plurality of piezoelectric elements (see JP-A 2000-28589 (KOKAI)). Because the sensitivity does not lower even with the size reduction of the piezoelectric elements, resolution can be improved.

However, it has been difficult to generate an ultrasonic beam with a narrow angle of beam spread by using this ultrasonic imaging apparatus.

BRIEF SUMMARY OF THE INVENTION

It is an object of the present invention to provide an ultrasonic imaging apparatus capable of efficiently generating an image both by using a transmission ultrasonic wave with a wide angle of beam spread and by using a transmission ultrasonic wave with a narrow angle of beam spread.

An ultrasonic imaging apparatus according to an aspect of the present invention includes: an ultrasonic transducer having a plurality of piezoelectric elements; a transmission control part controlling transmission timings of a plurality of first piezoelectric elements selected from the plural piezoelectric elements so as to make a synthesized wave of ultrasonic waves transmitted from the plural first piezoelectric elements match an ultrasonic wave transmitted from a predetermined virtual transmission point; a signal detecting circuit detecting an electric signal corresponding to an ultrasonic echo transmitted from the plural first piezoelectric elements, reflected by an inspection target, and received by each of a plurality of second piezoelectric elements selected from the plural piezoelectric elements; a first memory part storing a transmission time table showing transmission propagation times each taken for the ultrasonic wave to propagate from the predetermined virtual transmission point up to each of a plurality of space meshes into which a space including the inspection target is divided; a second memory part storing a reception time table showing reception propagation times each taken for the ultrasonic wave to propagate from each of the plural space meshes up to the plural second piezoelectric elements; a third memory part storing an offset time taken for the ultrasonic wave to propagate from the plural first piezoelectric elements up to the virtual transmission point; a calculating part calculating a total propagation time of the ultrasonic wave by adding the transmission propagation time, the reception propagation time, and the offset time; and a generating part generating an image corresponding to the inspection target based on the electric signal and the total propagation time.

BRIEF DESCRIPTION OF THE DRAWINGS

FIG. 5 is a schematic view showing an inspection target 20a.

DETAILED DESCRIPTION OF THE INVENTION

Figure 1:
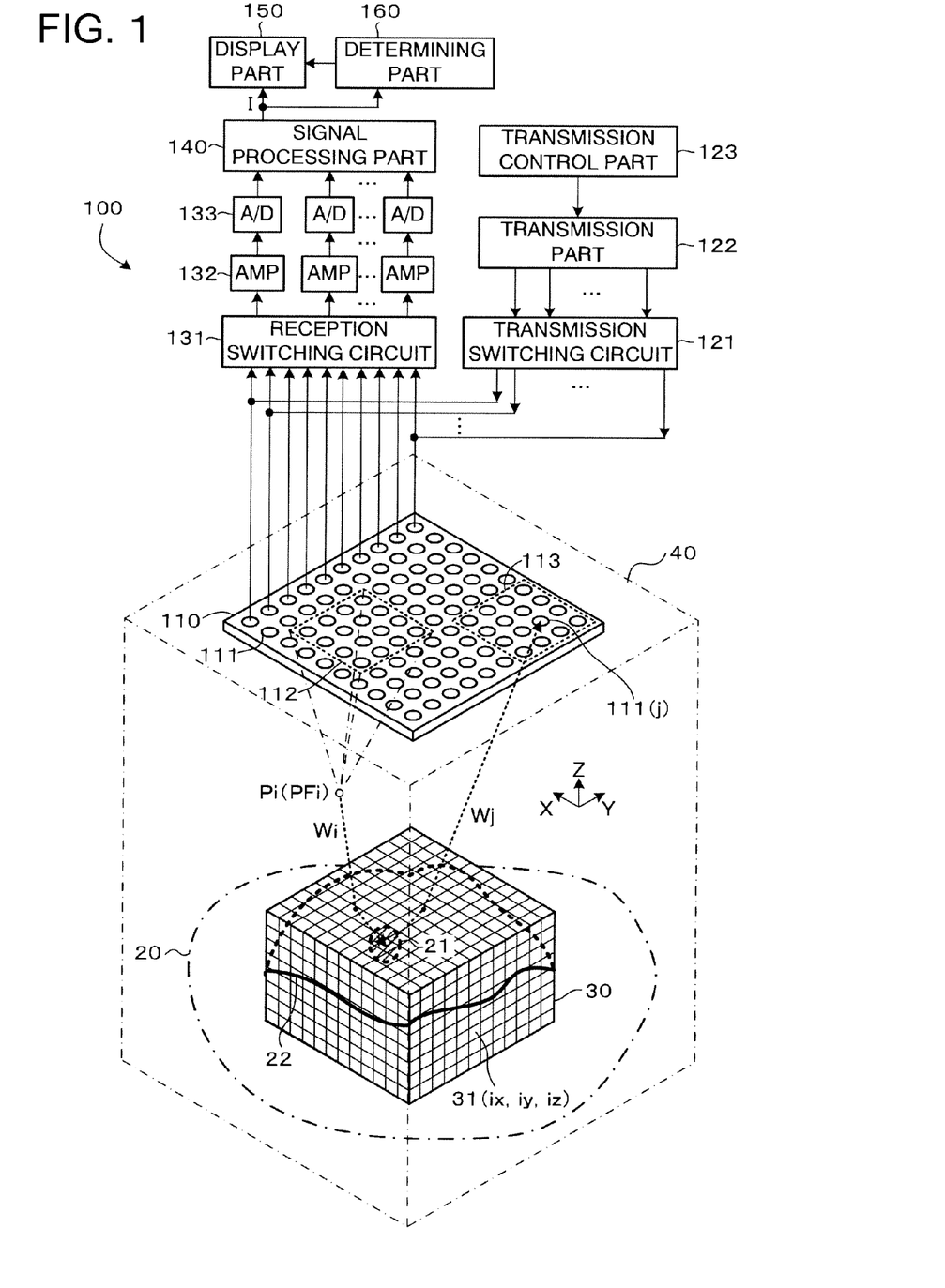
FIG. 1 is a block diagram showing an ultrasonic imaging apparatus 100 according to one embodiment of the present invention.

Hereinafter, an embodiment of the present invention will be described in detail with reference to the drawings. FIG. 1 is a block diagram showing an ultrasonic imaging apparatus 100 according to one embodiment of the present invention.

The ultrasonic imaging apparatus 100 has an ultrasonic transducer 110, a transmission switching circuit 121, a transmission part 122, a transmission control part 123, a reception switching circuit 131, amplifiers 132, A/D converters 133, a signal processing part 140, a display part 150, and a determining part 160. The ultrasonic imaging apparatus 100 transmits ultrasonic waves to an inspection target 20 and receives the ultrasonic waves reflected by a surface 22 and an inner part of an inspection target 20 to visualize an area within an imaging range 30 (the surface 22 and the inner part (defect 21 or the like) of the inspection target 20). Concretely, the imaging range 30 is visualized in a unit of each imaging mesh 31. As a result, the defect 21 in the inspection target 20 is detected.

The inspection target 20 is placed in an acoustic propagation medium 40. For the efficient propagation of the ultrasonic waves between the ultrasonic transducer 110 and the inspection target 20, the acoustic propagation medium 40 is disposed therebetween. As the acoustic propagation medium 40, a liquid medium (water, oil, or the like) or a solid medium (resin or the like) is usable.

The imaging range 30 represents a space range to be visualized by the ultrasonic imaging apparatus 100. The imaging meshes 31(ix, iy, iz) each have a cubic shape or a rectangular parallelepiped shape, and they are a plurality of regions into which the imaging range 30 is divided in different directions (for example, X, Y, and Z directions). The imaging meshes 31(ix, iy, iz) can be discriminated from one another by suffixes ix, iy, iz corresponding to these directions respectively. Here, ix=1 to Nx, iy=1 to Ny, and iz=1 to Nz, and the numbers Nx, Ny, Nz are the numbers of division of the imaging range 30 in the X, Y, and Z directions. The imaging meshes 31 correspond to a plurality of space meshes into which a space including the inspection target 20 is divided.

In the ultrasonic transducer 110, a plurality of piezoelectric elements 111 are arranged in matrix or in one row. In this example, the piezoelectric elements 111 are arranged in matrix in the X-Y direction. However, the arrangement direction of the piezoelectric elements 111 does not necessarily have to be the X-Y direction.

The piezoelectric elements 111 not only transmit the ultrasonic waves to the inspection target 20 but also receive ultrasonic echoes (reflected waves) reflected by the defect 21 or the like in the inspection target 20. The piezoelectric elements 111 each have a piezoelectric material and transmit the ultrasonic wave by converting an electric signal into the ultrasonic wave. Further, the piezoelectric elements 111 each receive the ultrasonic wave by converting the ultrasonic wave into an electric signal. The same piezoelectric element 111 can be used both for the transmission and reception.

The transmission switching circuit 121 selects the piezoelectric elements 111 used for the transmission. Here, the sixteen piezoelectric elements 111 are selected as a transmission piezoelectric element group 112. The transmission switching circuit 121 functions as "a transmission selecting part selecting the first piezoelectric elements in correspondence to each of a plurality of different virtual transmission points".

The transmission part 122 causes the piezoelectric elements 111 belonging to the transmission piezoelectric element group 112 selected by the transmission switching circuit 121 to transmit the ultrasonic waves. The transmission part 122 causes the transmission of the ultrasonic waves by applying single-pulse signals, pulse-train signals, or the like to the piezoelectric elements 111.

The transmission control part 123 controls the phases of electric signals output from the transmission part 122 (controls transmission timings of the ultrasonic waves). That is, the transmission timings of a predetermined number of the piezoelectric elements 111 in the transmission piezoelectric element group 112 selected by the transmission switching circuit 121 are controlled. As a result, a synthesized wave of the ultrasonic waves transmitted from the ultrasonic transducer 110 matches an ultrasonic wave transmitted from one virtual transmission point Pi (convergence point PFi, virtual point sound source PYi). That is, the transmission control part 123 corresponds to "a transmission control part controlling transmission timings of a plurality of first piezoelectric elements selected from the plural piezoelectric elements so as to make a synthesized wave of ultrasonic waves transmitted from the plural first piezoelectric elements match an ultrasonic wave transmitted from a predetermined virtual transmission point". This will be described in detail later.

The reception switching circuit 131 selects the piezoelectric elements 111 used for the reception. Here, the sixteen piezoelectric elements 111 are selected as a reception piezoelectric element group 113. The reception switching circuit 131 functions as "a reception selecting part selecting the second piezoelectric elements in correspondence to each of a plurality of different virtual transmission points".

The ultrasonic waves transmitted from the piezoelectric elements 111 in the transmission piezoelectric element group 112 propagate in the inspection target 20 after refracted by the surface 22 of the inspection target 20 via the acoustic propagation medium 40, and are reflected by the defect 21. Ultrasonic echoes reflected by the defect 21 are refracted again by the surface 22 of the inspection target 20 to be received by the piezoelectric elements 111 in the reception piezoelectric element group 112 via the acoustic propagation medium 40. The piezoelectric elements 111 in the reception piezoelectric element group 113 output electric signals (ultrasonic echo signals) corresponding to the received ultrasonic echoes.

The amplifiers 132 amplify the ultrasonic echo signals received from the piezoelectric elements 111 belonging to the reception piezoelectric element group 113.

The A/D converters 133 A/D-(analog-digital)-convert the ultrasonic echo signals amplified by the amplifiers 132. The A/D converters 133 sample the ultrasonic echo signals to generate later-described sampling data. The A/D converters 133 correspond to "a signal detecting circuit detecting an electric signal corresponding to an ultrasonic echo transmitted from the plural first piezoelectric elements, reflected by an inspection target, and received by each of a plurality of second piezoelectric elements selected from the plural piezoelectric elements".

The signal processing part 140 performs aperture synthesis of the A/D-converted ultrasonic echo signals to generate image data I including images of the surface 22 and the defect 21 of the inspection target 20. The generated image data I is transmitted to the display part 150 and the determining part 160. The aperture synthesis will be described in detail later.

The signal processing part 140 functions as the following parts:

a first memory part storing a transmission time table showing transmission propagation times each taken for the ultrasonic wave to propagate from the predetermined virtual transmission point up to each of a plurality of space meshes into which a space including the inspection target is divided.

a second memory part storing a reception time table showing reception propagation times each taken for the ultrasonic wave to propagate from each of the plural space meshes up to the plural second piezoelectric elements.

a third memory part storing an offset time taken for the ultrasonic wave to propagate from the plural first piezoelectric elements up to the virtual transmission point.

a calculating part calculating a total propagation time of the ultrasonic wave by adding the transmission propagation time, the reception propagation time, and the offset time.

a generating part generating an image corresponding to the inspection target based on the electric signal and the total propagation time.

Further, the generating part functions as the following parts:
- a time difference detecting part detecting a time difference between the transmission from the plural first piezoelectric elements and the detection of the sampling data of the ultrasonic echo.
- a determining part determining the space mesh corresponding to the sampling data of the ultrasonic echo based on the time difference and the total propagation time.
- an allocating part allocating a value corresponding to the sampling data to the determined space mesh.
- an image generating part generating image data by adding the values allocated to the space meshes.

The display part 150 is a device displaying an image by using the image data I, and is, for example, a CRT or a liquid crystal display.

The determining part 160 detects an abnormal region in the inspection target 20 by using the image data I output from the signal processing part 140. The determining part 160 functions as the following parts:
- a depth measuring part measuring distribution of depth of a bottom surface or a boundary surface of the inspection target based on depth-direction intensity distribution of the image data.
- a fourth memory part storing an attenuation table showing a relation between the depth and an attenuation characteristic of the ultrasonic wave.
- a generating part generating a determination table having a threshold value for determination regarding intensity of the image data (intensity of the ultrasonic wave), based on the attenuation table and the distribution of the depth.
- a deriving part deriving the intensity distribution of the image data.
- a detecting part detecting, in the image data, a region where the intensity is higher than the threshold value, based on the intensity distribution of the image data and the determination table.

This will be described in detail later.

(Details of Virtual Transmission Point Pi)

Figure 2A:
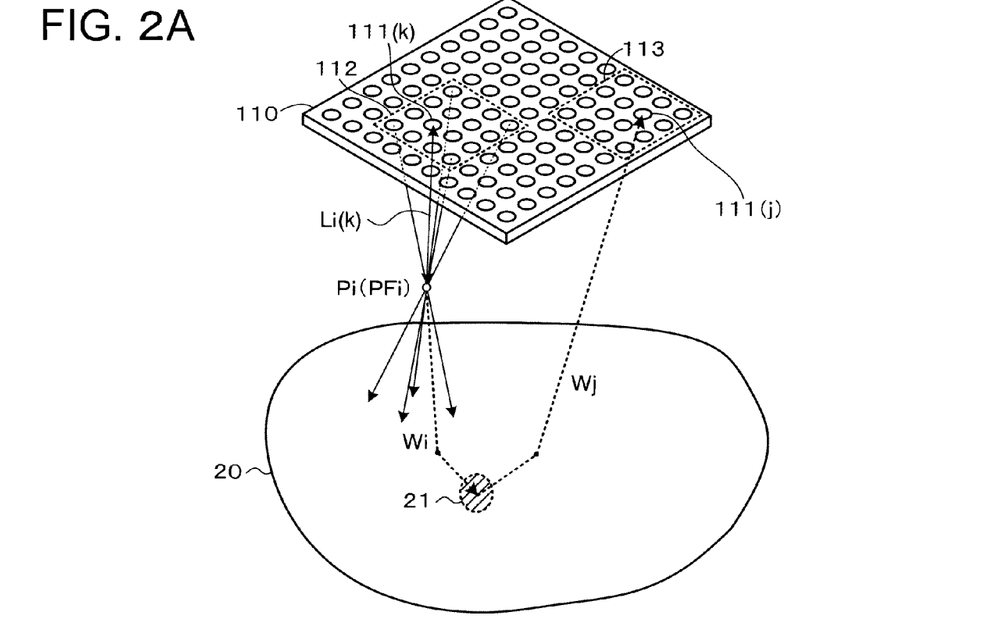
FIG. 2A is a schematic view showing a convergence point PFi.
Figure 2B:
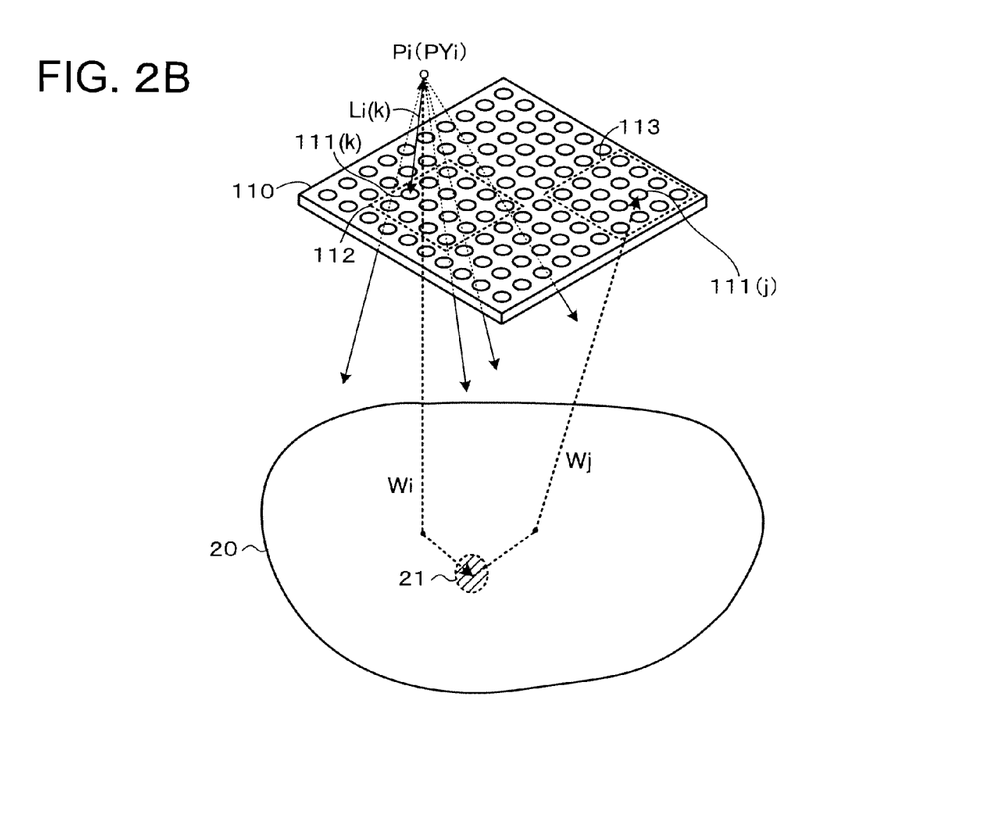
FIG. 2B is a schematic view showing a virtual point sound source PYi.

Hereinafter, the virtual transmission point Pi (convergence point PFi, virtual point sound source PYi) will be described in detail. When the synthesized wave of the ultrasonic waves transmitted from the piezoelectric elements 111 of the transmission piezoelectric element group 112 matches the ultrasonic wave transmitted from one point Pi, let us call this point Pi a virtual transmission point Pi. As the virtual transmission point Pi, two points are possible, that is, the convergence point PFi and the virtual point sound source PYi. FIG. 2A and FIG. 2B are schematic views showing the convergence point PFi and the virtual point sound source PYi respectively.

The convergence point PFi is a point that is set in front of the ultrasonic transducer 110 (the inspection target 20 side) and at which the synthesized wave of the ultrasonic waves transmitted from the piezoelectric elements 111 belonging to the transmission piezoelectric element group 112 converge. That is, the synthesized wave is a converging wave converging at one convergence point, and this convergence point corresponds to the virtual transmission point Pi. The ultrasonic waves having passed through the convergence point PFi propagate as they are in the acoustic propagation medium 40. At this time, the synthesized wave of the ultrasonic waves transmitted from the ultrasonic transducer 110 can be handled as practically the same as an ultrasonic wave transmitted from the convergence point PFi.

The virtual point sound source PYi is set behind the ultrasonic transducer 110 (opposite the inspection target 20). When the synthesized wave of the ultrasonic waves transmitted from the piezoelectric elements 111 belonging to the transmission piezoelectric element group 112 matches an ultrasonic wave transmitted from one point PYi, this point PYi is the virtual point sound source PYi. That is, the synthesized wave is a diverging wave diverging from one virtual divergence point (virtual point sound source PYi), and this divergence point corresponds to the virtual transmission point Pi. At this time, the synthesized wave of the ultrasonic waves transmitted from the ultrasonic transducer 110 can be handled as practically the same as the ultrasonic wave transmitted from the virtual point sound source PYi.

In this manner, the synthesized wave of the ultrasonic waves transmitted from the ultrasonic transducer 110 can be made to match the ultrasonic wave from the virtual transmission point Pi (convergence point PFi, virtual point sound source PYi). For this purpose, the transmission timings of the piezoelectric elements 111 belonging to the transmission piezoelectric element group 112 are controlled. Here, each of the piezoelectric elements 111 is shown as a piezoelectric element 111(k) and is identified by a suffix k.

In order to cause the transmission of the ultrasonic wave from the convergence point PFi at a time t0, the ultrasonic wave is transmitted from each of the piezoelectric elements 111(k) at a time (t0−Δt1(k)) prior to the time t0. At this time, a transmission advance time Δt1(k) in each of the piezoelectric elements 111(k) is controlled according to a distance Li(k) from the piezoelectric element 111(k) to the convergence point PFi.

$$\Delta t1(k)=Li(k)/v \qquad \text{expression (1)}$$

v: propagation velocity of the ultrasonic wave in the acoustic propagation medium 40

In order to cause the transmission of the ultrasonic wave at the time t0 from the virtual point sound source PYi, the ultrasonic wave is transmitted from each of the piezoelectric elements 111(k) at a time (t0+Δt2(k)) later than the time t0. At this time, a transmission delay time Δt2(k) in each of the piezoelectric elements 111(k) is controlled according to a distance Li(k) from the piezoelectric element 111(k) to the virtual point sound source PYi.

$$\Delta t2(k)=Li(k)/v \qquad \text{expression (2)}$$

v: propagation velocity of the ultrasonic wave in the acoustic propagation medium 40

As described above, it is possible to generate the synthesized wave that matches the ultrasonic wave transmitted from the virtual transmission point Pi, by deviating the transmission timings of the ultrasonic waves in the piezoelectric elements 111(k). In this case, ideally, the synthesized wave becomes part of a spherical wave around the virtual transmission point Pi being the center. However, the synthesized wave need not be a perfect spherical wave. As previously described, the image of the inspection target 20 is generated in a unit of the imaging mesh 31 (resolution substantially equal to that of the imaging meshes 31). Therefore, variation of a wavefront to about the same degree as that of the imaging meshes 31 is permissible. The virtual transmission point Pi itself need not be a perfect point, and some degree of spread (region) (for example, about the same degree as that of the imaging meshes 31) is permissible.

Here, preferably, a plurality of virtual transmission points Pi are used for the generation of the image of the inspection target 20. This can improve resolution of the image.

Figure 3:
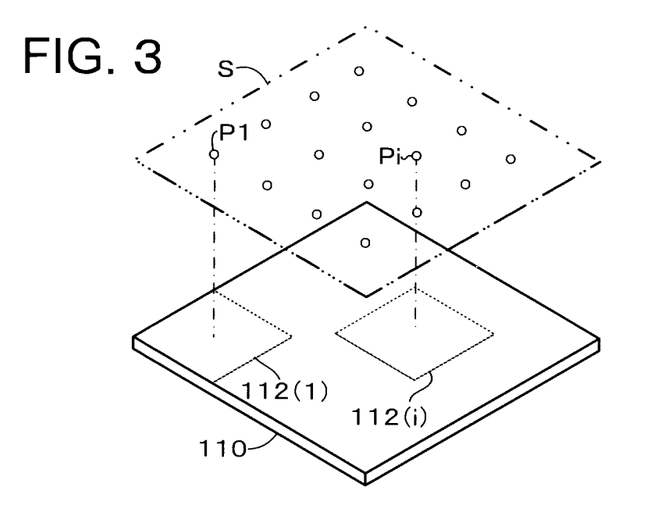
FIG. 3 is a schematic view showing an example of a plurality of virtual transmission points Pi.

FIG. 3 is a schematic view showing an example of the plural virtual transmission points Pi. The virtual transmission points Pi (virtual point sound sources PYi) are arranged on a plane S (X-Y plane) parallel to the ultrasonic transducer 110. Here, the plane S where the virtual transmission points Pi are set is located behind the ultrasonic transducer 110 (opposite the inspection target 20). On the other hand, the plane S where the virtual transmission points Pi are set may be located in front of the ultrasonic transducer 110 (the inspection target 20 side). Further, the plane S where the virtual transmission points Pi are set may be a curved plane.

Here, changing the distance between the virtual transmission point Pi and the ultrasonic transducer 110 will be studied. As shown in FIG. 2A and FIG. 2B, decreasing the distance between the virtual transmission point Pi and the ultrasonic transducer 110 makes it possible to irradiate the inspection target 20 with an ultrasonic wave with a wide angle of beam spread. In particular, when the virtual point sound source PYi is set as the virtual transmission point Pi, the distance between the virtual transmission point Pi and the inspection target 20 is large, which makes it possible to irradiate a wider range of the inspection target 20 with the ultrasonic wave to easily visualize the wider range.

On the other hand, increasing the distance between the virtual transmission point Pi and the ultrasonic transducer 110 makes it possible to irradiate the inspection target 20 with the ultrasonic wave with a narrow angle of beam spread. In particular, setting the convergence point PFi as the virtual transmission point Pi and locating the convergence point PFi near the inspection target 20 or in the inspection target 20 facilitate the high-resolution visualization of a specific place.

As described above, the adjustment of the width of directivity of the ultrasonic wave emitted to the inspection target 20 is enabled by the appropriate change in the distance between the virtual transmission point Pi and the ultrasonic transducer 110. As a result, it is possible to efficiently visualize the whole or part of the inspection target 20.

Here, changing the piezoelectric elements 111 selected by the transmission switching circuit 121 (transmission piezoelectric element group 112) in correspondence to the virtual transmission point Pi is conceivable. For example, in correspondence to the virtual transmission point Pi in FIG. 3, selecting a transmission piezoelectric element group 112(i) near the virtual transmission point Pi is conceivable. Thus selecting the transmission piezoelectric element group 112(i) near the virtual transmission point Pi enables the generation of the virtual transmission point Pi by effectively using a relatively small number of the piezoelectric elements 111. In this example, part of the transmission piezoelectric element group 112(i) has an overlapping portion. The transmission piezoelectric element group 112(i) does not necessarily have to have an overlapping portion.

Here, it is also possible not to change the transmission piezoelectric element group 112 in correspondence to the virtual transmission point Pi. For example, by using all the piezoelectric elements 111 and generating different virtual transmission points Pi, the direction of the transmitted ultrasonic waves may be changed. The use of a large number of the piezoelectric elements 111 enables the high-precision and powerful transmission of the ultrasonic waves from the virtual transmission points Pi. In this case, the transmission switching circuit 121 is not necessary.

The above discussion regarding the transmission piezoelectric element group 112 also applies to the reception piezoelectric element group 113 to some extent. That is, changing the piezoelectric elements 111 selected by the reception switching circuit 131 (reception piezoelectric element group 113) in correspondence to the virtual transmission point Pi is conceivable. Selecting the reception piezoelectric element group 113(i) in correspondence to the virtual transmission point Pi makes it possible to receive the ultrasonic wave by effectively using a relatively small number of the piezoelectric elements 111. On the other hand, it is also possible not to change the reception piezoelectric element group 113 in correspondence to the virtual transmission point Pi. For example, the ultrasonic echoes may be received by using all the piezoelectric elements 111, and the use of a large number of the piezoelectric elements 111 enables the high-precision reception of the ultrasonic waves from the inspection target 20. In this case, the reception switching circuit 131 is not necessary.

As previously described, in FIG. 1, totally the sixteen piezoelectric elements 111 of the transmission piezoelectric element group 112 are selected by the transmission switching circuit 121. In this case, sixteen voltage signals in a pulse form or with a continuous wave are output from the transmission part 122. Here, the transmission timings of the voltage signals transmitted from the transmission part 122 are controlled by the transmission control part 123. As a result, the synthesized wave of the transmission ultrasonic waves of the transmission piezoelectric element group 112 matches the wavefront of the ultrasonic wave transmitted from the virtual transmission point Pi.

Here, the pulsed or continuous-wave voltage signals output from the transmission part 122 may all have the same shape (same voltage). In order for the wavefront of the ultrasonic wave transmitted from the transmission point P to become almost a spherical wave (in order to reduce direction dependency), transmission intensities of the ultrasonic waves in the piezoelectric elements 111(k) are made different according to the distances L(k) between the virtual transmission point Pi and the piezoelectric elements 111(k). However, even making the transmission intensities in the piezoelectric elements 111(k) different causes no great change in the direction dependency, and therefore, the transmission intensities of the ultrasonic waves from the piezoelectric elements 111(k) may be equal to one another.

The ultrasonic waves thus transmitted propagate as a spreading wave Wi transmitted from the virtual transmission point Pi to propagate in the inspection target 20 after being refracted by the surface 22 of the inspection target 20. Further, the ultrasonic waves are reflected by the defect 21 to be received by the piezoelectric elements 111 in the ultrasonic transducer 110. That is, the ultrasonic echoes received by the piezoelectric elements 111 in the reception piezoelectric element group 113 selected by the reception switching circuit 131 are simultaneously amplified in the six amplifiers 132, and are further taken into the signal processing part 140 after simultaneously converted into digital signals in the sixteen A/D converters 133.

The above process is repeated. That is, the positional change of the virtual transmission point Pi by the change in the transmission timings of the output voltage signals by the transmission part 122 is repeated every time the transmission switching circuit 121 changes the selection. Consequently, the ultrasonic waves Wi are transmitted from a large number of the virtual transmission points Pi and are reflected by the defect 21, and the digital signals of the reflected ultrasonic echoes are collected in the signal processing part 140.

(Details of Aperture Synthesis)

Hereinafter, the aperture synthesis by the signal processing part 140 will be described in detail.

In the signal processing part 140, the ultrasonic image in the imaging range 30 is generated by the aperture synthesis of the ultrasonic echoes digitally collected. Specifically, data of the ultrasonic echoes digitally collected are assigned to the imaging meshes 31 in the imaging range 30.

Here, a case will be studied where the ultrasonic wave Wi virtually transmitted from the virtual transmission point Pi is reflected by the defect 21 and is received as an ultrasonic echo Wj by the piezoelectric element 111(*j*) in the reception piezoelectric element group 113.

Figure 4:
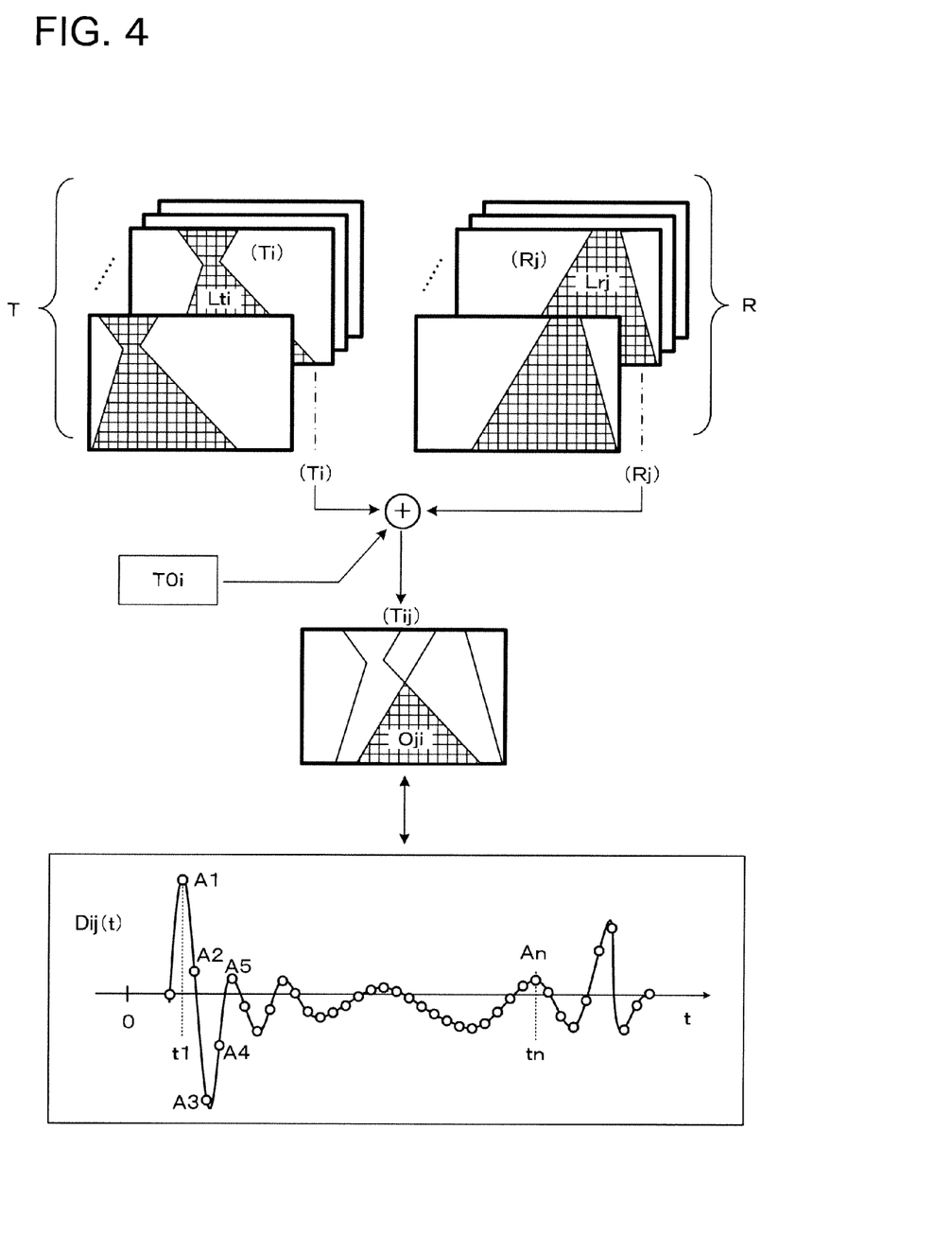
FIG. 4 is a schematic view showing a process of image synthesis.

FIG. 4 is a schematic view showing a process of the image synthesis. In the signal processing part 140, a transmission time table group T and a reception time table group R are stored.

The transmission time table group T contains transmission time tables Ti showing transmission ultrasonic propagation times ti(ix, iy, iz) corresponding to the virtual transmission point Pi and all the imaging meshes 31(ix, iy, iz). The reception time table group R contains reception time tables Rj showing reception ultrasonic propagation times rj(ix, iy, iz) taken for the ultrasonic waves reflected by all the imaging meshes 31(ix, iy, iz) to be received by the piezoelectric element 111(*j*).

The transmission ultrasonic propagation time ti(ix, iy, iz) shows the time taken for the ultrasonic wave to propagate from the virtual transmission point Pi up to the imaging mesh 31(ix, iy, iz) in the imaging range 30. The reception ultrasonic propagation time rj(ix, iy, iz) shows the time taken for the ultrasonic wave to propagate from the imaging mesh 31(ix, iy, iz) in the imaging range 30 up to the piezoelectric element 111(*j*).

The transmission ultrasonic propagation time ti and the reception ultrasonic propagation time rj are defined roughly by a distance L1(ix, iy, iz) from the virtual transmission point Pi to the imaging mesh 31(ix, iy, iz) and a distance L2(ix, iy, iz, j) from the imaging mesh 31(ix, iy, iz) up to the piezoelectric element 111(*j*). By dividing the distances L1, L2 by the velocity of the ultrasonic wave, it is possible to roughly calculate the transmission ultrasonic propagation time ti and the reception ultrasonic propagation time rj.

As previously described, the ultrasonic wave is refracted by the surface 22 of the inspection target 20. Therefore, for the accurate calculation of the transmission ultrasonic propagation time ti and the reception ultrasonic propagation time rj, it is necessary to find the outer shape of the inspection target 20. If the outer shape of the inspection target 20 is known, the transmission ultrasonic propagation time ti and the reception ultrasonic propagation time rj can be calculated in consideration of Snell's law. For this calculation, various simulations are usable.

Incidentally, when the outer shape of the inspect ion target 20 is not known, using the imaging result that the ultrasonic imaging apparatus 100 itself obtains regarding the outer shape of the inspection target 20 also makes it possible to find the outer shape of the inspection target 20.

The process of the image synthesis in FIG. 4 shows a case where reception waveform data Dij(t) that is generated when the ultrasonic wave from the virtual transmission point Pi is received by the piezoelectric element 111(*j*) is processed.

(1) Calculation of the Total Propagation Time tij

The time (total propagation time) tij taken for the ultrasonic wave transmitted from the ultrasonic transducer 110 to be received by the piezoelectric element 111(*j*) is calculated.

By adding the transmission ultrasonic propagation time ti, the reception ultrasonic propagation time rj, and the offset time T0i, the total propagation time tij is calculated.

$$tij = ti + rj + T0i \qquad \text{expression (3)}$$

The offset time T0i is the ultrasonic transmission time up to the time when the ultrasonic wave transmitted from the ultrasonic transducer 110 (transmission piezoelectric element group 112) reaches the virtual transmission point Pi. As previously described, the transmission timings of the piezoelectric elements 111(*k*) belonging to the transmission piezoelectric element group 112 do not generally coincide with one another. The offset time T0i can be decided based on a representative piezoelectric element 111 that is selected from the piezoelectric elements 111(*k*) belonging to the transmission piezoelectric element group 112 and defined as a representative point. The representative point (representative piezoelectric element) is decided so as to correspond to a reference point 0 of the time of the reception waveform data Dij(t).

An absolute value of the offset time T0i corresponds to the aforethe advance time Δt1(k) or delay time Δt2(k). When the virtual transmission point Pi is the convergence point PFi, the offset time T0i has a positive value. On the other hand, when the virtual transmission point Pi is the virtual point sound source PYi, the offset time T0i has a negative value.

As described above, the total propagation time tij can be calculated for all the imaging meshes 31(ix, iy, iz).

Here, a range of the imaging meshes 31(ix, iy, iz) involved in the calculation of the total propagation time tij can be limited.

In the transmission time tables Ti and the reception time tables Rj in FIG. 4, a transmission region Lti and a reception region Lrj are set as effective regions of the imaging (aperture synthesis). The calculation range of the total propagation time tij (range of the aperture synthesis) is limited to these effective regions. Limiting the calculation range enhances the speed and precision of the processing.

The transmission region Lti is set according to the position of the virtual transmission point Pi and a profile (directivity) of the ultrasonic wave transmitted from the virtual transmission point Pi. Since the ultrasonic wave transmitted from the virtual transmission point Pi has some degree of directivity, the intensity distribution of the ultrasonic wave in the imaging range 30 is regulated according to the virtual transmission point Pi. The ultrasonic echo Wj from the imaging mesh 31 where the intensity of the ultrasonic wave from the virtual transmission point Pi is weak may be practically neglected. Rather, the neglection results in enhanced precision of later-described allotment of the reception waveform data Dij(t).

The reception region Lrj is set according to the position of the piezoelectric element 111(*j*) for reception and a reception profile (directivity). The piezoelectric element 111(*j*) tends to have high reception sensitivity to an ultrasonic wave from a front direction and has low reception sensitivity to an ultrasonic wave from an oblique direction. Therefore, the ultrasonic echo Wj from the imaging mesh 31 located in the direction to which the piezoelectric element 111(*j*) for reception has low reception sensitivity may be practically neglected. Rather, the neglection results in enhanced precision of the later-described allotment of the reception waveform data Dij(t). Whether the reception directivity is narrow or wide depends on the size of the piezoelectric element 111. When the size of the piezoelectric element 111 is large, the directivity becomes wide and when it is small, the directivity becomes narrow.

From the above, in the process of the image synthesis, it is possible to limit the image synthesis only to an overlapping portion Oij of the transmission region Lti and the reception region Lrj and to bypass the image synthesis process of regions other than the limited region. As a result, it is possible to reduce a load of the image synthesis, realizing the higher speed, and to reduce an unnecessary image synthesis noise, realizing higher precision.

(2) Detection of Delay Times of the Sampling Data of the Reception Waveform Data Dij(t)

Sampling data A1 ... An on the reception wave form data Dij(t) are detected. Further, a delay time tn from the transmission of the ultrasonic wave up to the detection of the sampling data An is detected. These sampling data An correspond to the ultrasonic echo Wj reflected by any of the imaging meshes 31(ix, iy, iz). As previously described, the sampling data An are generated by the A/D converters 133, and are obtained by sampling the reception waveform data Dij(t) (ultrasonic echo) at predetermined time intervals, for instance.

(3) Allocation of Data to the Imaging Mesh 31

Based on the total propagation time tij, the reception waveform data Dij(t) can be allocated to the imaging mesh 31(ix, iy, iz).

Specifically, as a result of finding the total propagation time tij corresponding to the delay time tn, the imaging mesh 31(ix, iy, iz) to which the sampling data An corresponds is detected. A value is assigned to the detected imaging mesh 31(ix, iy, iz). For example, a value An of the sampling data is assigned according to the following expression.

$$I(ix, iy, iz) = I(ix, iy, iz) + An \qquad \text{expression (4)}$$

Here, the image data I(ix, iy, iz) represents a cumulative value of the intensity of the ultrasonic echo Wj from the imaging mesh 31(ix, iy, iz). That is, the imaging data I presents three-dimensional intensity distribution of the ultrasonic echo Wj.

Here, there are generally a plurality of the total propagation times Tij (imaging meshes 31(ix, iy, iz)) corresponding to the delay time tn. In this case, the value corresponding to the one sampling data An is apportioned among the plural imaging meshes 31(ix, iy, iz). For example, an amount An/m equal to the value divided by the number m of the plural imaging meshes 31 is allocated to each of the imaging meshes 31(I=I+An/m). This apportionment will be a cause of noise. However, by superimposing a large number of data, it is possible to practically cancel the noise component.

As previously described, the imaging meshes 31 involved in the calculation of the total propagation time tij can be limited to the range Oij. This restricts the useless apportionment of values to the plural imaging meshes 31 and reduces an unnecessary image synthesis noise.

By repeating the processes (2), (3) for the virtual transmission points Pi and the piezoelectric elements 111(j), it is possible to generate a three-dimensional image of the whole inspection target (aperture synthesis).

(4) Image Display

By changing luminance on the display part 150 according to the image data I, it is possible to display images of the surface 22 and the defect 21 of the inspection target 20 on the display part 150.

(Detection of Abnormal Region)

Hereinafter, the detection of an abnormal region by the determining part 160 will be described.

Figure 5:
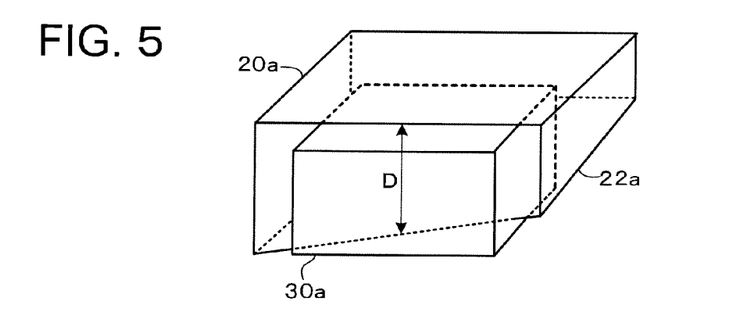

Here, a description will be given of a process for detecting an abnormal region Hp in an inspection target 20a having the distribution of thickness D. FIG. 5 is a schematic view showing the inspection target 20a. An imaging range 30a is set so as to include a bottom surface portion or a boundary portion of the inspection target 20a.

Figure 6:
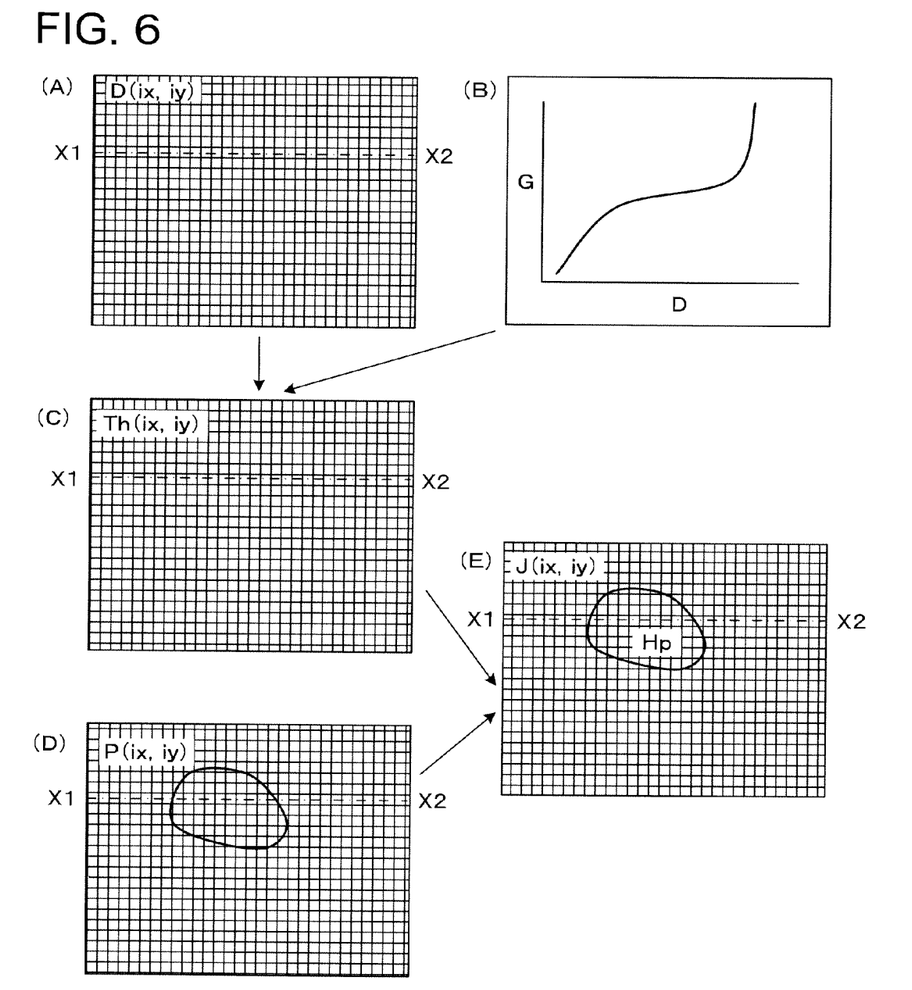
FIG. 6 is a schematic chart showing an example of the procedure for detecting an abnormal region.
Figure 7:
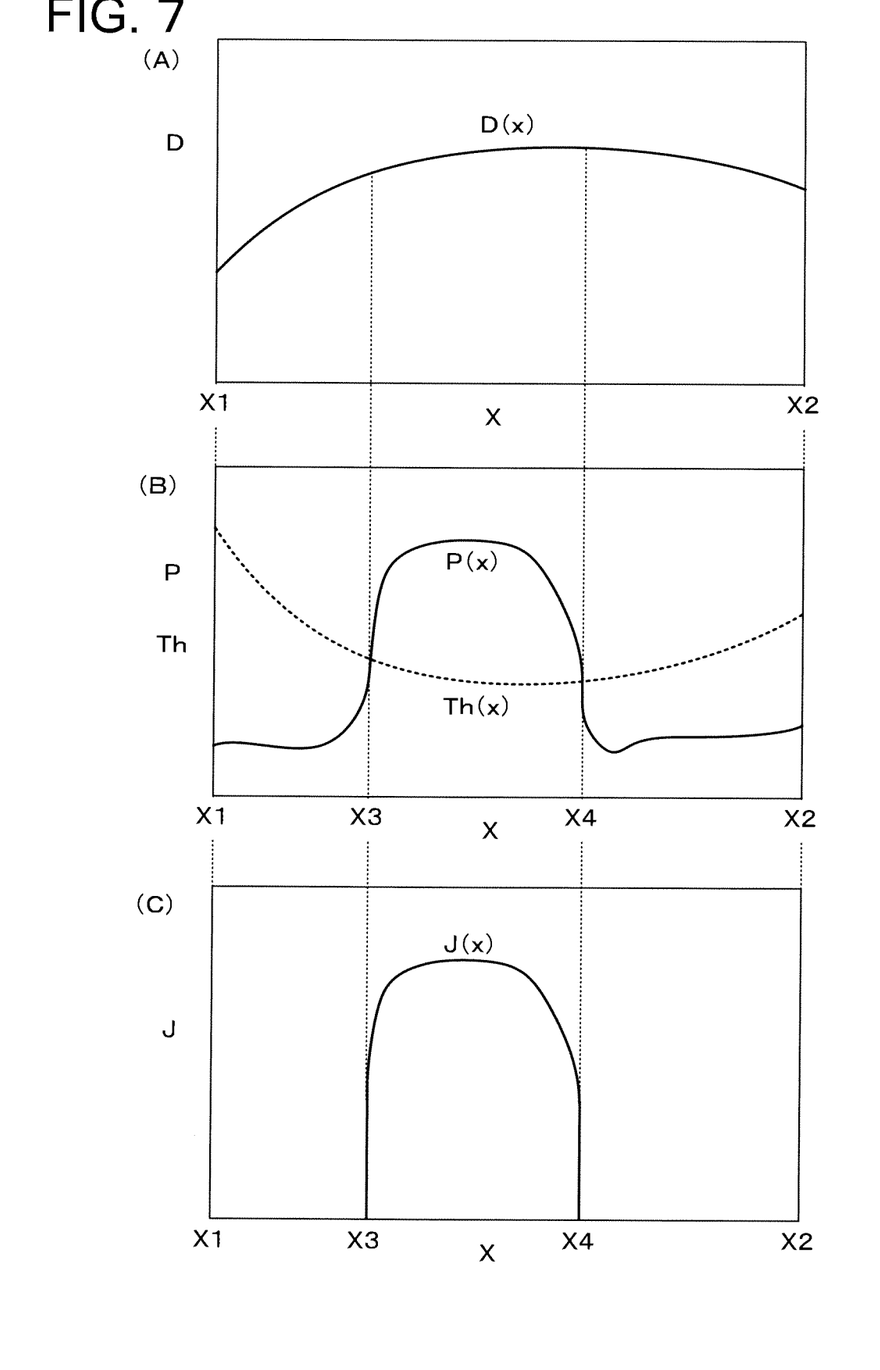
FIG. 7 is a chart showing examples of bottom surface depth distribution D(x), determination table Th(x), intensity distribution P(x), and determination image data J(x), in an X direction.

FIG. 6 is a schematic chart showing an example of the procedure for detecting the abnormal region. This schematic chart includes bottom surface depth distribution D(ix, iy), a depth attenuation characteristic G(D), a determination table Th(ix, iy), intensity distribution P(ix, iy), and determination image data J(ix, iy). FIG. 7 is a chart showing graphs D(x), Th(x), P(x), J(x) corresponding to the bottom surface depth distribution D(ix, iy), the depth attenuation characteristic G(D), the determination table Th(ix, iy), the intensity distribution P(ix, iy), and the determination image data J(ix, iy) respectively. These graphs show how the bottom surface depth distribution D(ix, iy) and so on change in an X-axis direction (x1-x2 in FIG. 6).

(1) Measurement of the Depth D of the Bottom Surface Portion or the Boundary Portion of the Inspection Target 20a By detecting a depth-direction peak position of the image data I in the imaging range 30, it is possible to measure the depth D of the bottom surface portion or the boundary portion of the inspection target 20a (see FIG. 6(A) and FIG. 7(A)). Concretely, in the image data I(ix, iy, iz), the suffix iz is varied while the suffixes ix, iy are fixed, and iz where the image data I is the most intense is found.

In FIG. 5, the imaging range 30a includes only the bottom surface of the inspection target 20a (does not include an upper surface). In this case, it is thought that the largest peak in the depth direction in the image data I(ix, iy, iz) corresponds to the bottom surface of the inspection target 20a.

On the other hand, when the imaging range 30a includes both the upper surface and the bottom surface of the inspection target 20a, peaks corresponding to the upper surface and the bottom surface ear (a plurality of maximum points iz of the image data I exist). In this case, based on a peak value of the image data I and iz (depth) at this time, the peak corresponding to the bottom surface portion can be detected. Since ultrasonic echoes from the front surface and the bottom surface of the inspection target 20a are generally intense, a deeper one of the two large peaks is the peak corresponding to the bottom surface portion.

In this manner, the depth D of the bottom surface portion of the inspection target 20a, that is, the depth distribution D(D(ix, iy), D(x)) can be measured for (ix, iy).

(2) Generation of the Determination Table Th

The determination table Th(ix, iy) is generated (FIG. 6(C), FIG. 7(B)) according to the bottom surface depth distribution D(ix, iy) and the generalized depth attenuation characteristic G(D) (FIG. 6(B)).

The determination table Th(ix, iy) shows the distribution of reference intensity Th serving as a basis of the determination of the presence or absence of an abnormal region. As will be described later, when some region has a higher intensity P in the intensity distribution P(ix, iy) than the reference intensity Th in the determination table Th(ix, iy), this region is determined as an abnormal region.

The depth attenuation characteristic G(D) represents a relation between the depth D and an attenuation amount G of the ultrasonic wave. When the depth D becomes larger, the attenuation amount G(D) of the ultrasonic wave increases and the intensity of the ultrasonic echo decreases. Therefore, by substituting the bottom surface depth distribution D(ix, iy) in the depth attenuation characteristic G(D), it is possible to find attenuation amount distribution G(ix, iy). Based on the attenuation amount distribution G(ix, iy), the determination table Th(ix, iy) is generated.

(3) Measurement of the Intensity Distribution P(ix, iy)

By detecting peak level of data in the depth direction in the imaging range 30a, reflection intensities in the bottom surface portion or the boundary portion are measured, and the intensity distribution P(ix, iy) is generated from the result (FIG. 6(D), FIG. 7(B)).

For the intensity distribution P(ix, iy), the values I(ix, iy, iz) assigned to the imaging meshes 31(ix, iy, iz) at the depth D (iz corresponding to D) are usable.

(4) Detection of the Abnormal Region Hp

By comparing the intensity distribution P(ix, iy) with the determination table Th(ix, iy), it is possible to display the determination image J(ix, iy) and detect the abnormal region Hp from the result. As shown in FIG. 7, since the intensity P(ix, iy) in an X3-X4 range is higher than the determination value Th(ix, iy), it can be determined that this range is the abnormal region Hp.

When a region where the attenuation of the ultrasonic wave is small is present in the inspection target 20a, the reflection intensity when the ultrasonic wave passing through this region reaches the bottom surface portion or the boundary portion of the inspection target 20a becomes high. That is, the region with the small attenuation of the ultrasonic wave corresponds to the abnormal region Hp.

If the ultrasonic wave is reflected by a boundary of the abnormal region Hp, the peak of the reception waveform data Dij(t) appears in correspondence to the boundary, and the abnormal region Hp is detected. However, if the reflection intensity of the ultrasonic wave at the boundary of the abnormal region Hp is low, it is difficult to detect the abnormal region Hp by using the peak of the reception waveform data Dij(t).

On the other hand, in this embodiment, even when the reflection from the boundary of the abnormal region Hp is weak (or even when there is no clear boundary), it is possible to detect the abnormal region Hp (a region with small attenuation of the ultrasonic wave) based on the reflection intensity from the bottom surface or the like of the inspection target 20a.

As the determination image J(ix, iy), usable is an image in which a range where the intensity P in the intensity distribution P(ix, iy) is lower than the determination value Th is set to "0".

As described above, according to this embodiment, by controlling the transmission timings of the plural piezoelectric elements 111 in the ultrasonic transducer 110, it is possible to scan the transmission beams while electronically controlling the divergence and the convergence of the transmission ultrasonic waves. For the purpose of the three-dimensional imaging from a large number of ultrasonic echo data received as a result of the scanning, the pre-calculated ultrasonic propagation times stored in the transmission time tables T and the reception time tables R are used. Further, since the transmission/reception directivity of the ultrasonic waves is reflected in the transmission time tables T and the reception time tables R, it is possible to realize a three-dimensional ultrasonic imaging apparatus synthesizing and displaying a three-dimensional image at high speed and with high precision.

(Other Embodiments)

Embodiments of the present invention are not limited to the above-described embodiment, and the above-described embodiment can be expanded and modified, and the expanded and modified embodiments are also included in the technical scope of the present invention. In the above-described embodiment, the piezoelectric elements 111 are arranged in matrix. On the other hand, the piezoelectric elements 111 can also be arranged linearly (in one row). For example, there may be a case where the inspection target 20 is thin in the depth direction (Y direction). In such a case, it suffices if the piezoelectric elements 111 are linearly arranged in the X direction and a two-dimensional image in the X-Z direction can be generated. At this time, by arranging the virtual transmission points Pi linearly in the X direction and applying the aperture synthesis, it is possible to generate a two-dimensional image in the X-Z direction.

What is claimed is:

1. An ultrasonic imaging apparatus comprising:
an ultrasonic transducer having a plurality of piezoelectric elements;
a transmission control part configured to control transmission timings of a plurality of first piezoelectric elements selected from the plural piezoelectric elements so as to generate a synthesized wave of ultrasonic waves transmitted from the plural first piezoelectric elements which matches an ultrasonic wave transmitted from a predetermined virtual transmission point;
a signal detecting circuit configured to detect an electric signal corresponding to an ultrasonic echo transmitted from the plural first piezoelectric elements, reflected by an inspection target, and received by each of a plurality of second piezoelectric elements selected from the plural piezoelectric elements;
a first memory part configured to store a transmission time table showing transmission propagation times each taken for the ultrasonic wave to propagate from the predetermined virtual transmission point up to each of a plurality of space meshes into which a space including the inspection target is divided;
a second memory part configured to store a reception time table showing reception propagation times each taken for the ultrasonic wave to propagate from each of the plural space meshes up to the plural second piezoelectric elements;
a third memory part configured to store an offset time taken for the ultrasonic wave to propagate from a representation piezoelectric element of the plural first piezoelectric elements up to the virtual transmission point;
a calculating part configured to calculate a total propagation time of the ultrasonic wave by adding the transmission propagation time, the reception propagation time, and the offset time; and
a generating part configured to generate an image corresponding to the inspection target based on the electric signal and the total propagation time.

2. The ultrasonic imaging apparatus according to claim 1, wherein the synthesized wave is a converging wave converging to one convergence point and diverging from the convergence point, and the convergence point corresponds to the virtual transmission point.

3. The ultrasonic imaging apparatus according to claim 1, wherein the synthesized wave is a diverging wave diverging from one virtual divergence point, the synthesized wave does not converge to the divergence point, and the divergence point corresponds to the virtual transmission point.

4. The ultrasonic imaging apparatus according to claim 1, wherein the transmission control part controls the transmission timings of the plural first piezoelectric elements a plurality of times so as to make the synthesized wave match ultrasonic waves transmitted from a plurality of the different virtual transmission points;
wherein the signal detecting part detects a plurality of electric signals corresponding to the plural different virtual transmission points respectively; and
wherein the generating part generates the image corresponding to the inspection target based on the plural electric signals.

5. The ultrasonic imaging apparatus according to claim 4, wherein the plural different virtual transmission points are arranged in matrix on a predetermined virtual plane.

6. The ultrasonic imaging apparatus according to claim 1, further comprising, a transmission selecting part configured to select the first piezoelectric elements in correspondence to each of the plural different virtual transmission points.

7. The ultrasonic imaging apparatus according to claim 1, further comprising,
a reception selecting part configured to select the second piezoelectric elements in correspondence to each of the plural different virtual transmission points.

8. The ultrasonic imaging apparatus according to claim 1, wherein the calculating part calculates the total propagation time corresponding to the transmission propagation time corresponding only to part of the plural space meshes.

9. The ultrasonic imaging apparatus according to claim 1, wherein the calculating part calculates the total propagation time corresponding to the reception propagation time corresponding only to part of the plural space meshes.

10. The ultrasonic imaging apparatus according to claim 1, wherein the electric signal detected by the signal detecting circuit is sampling data of the ultrasonic echo; and
wherein the generating part has:
  a time difference detecting part configured to detect a time difference between the transmission from the plural first piezoelectric elements and the detection of the sampling data;
  a determining part configured to determine the space mesh corresponding to the sampling data based on the time difference and the total propagation time;
  an allocating part configured to allocate a value corresponding to the sampling data to the determined space mesh; and
  an image generating part configured to generate image data by adding the values allocated to the space meshes.

11. The ultrasonic imaging apparatus according to claim 1, further comprising:
  a depth measuring part configured to measure distribution of depth of a bottom surface or a boundary surface of the inspection target based on depth-direction intensity distribution of the image data;
  a fourth memory part configured to store an attenuation table showing a relation between the depth and an attenuation characteristic of the ultrasonic wave;
  a generating part configured to generate a determination table having a threshold value for determination regarding intensity of the image data, based on the attenuation table and the distribution of the depth;
  a deriving part configured to derive the intensity distribution of the image data; and
  a detecting part configured to detect, in the image data, a region where the intensity is higher than the threshold value, based on the intensity distribution of the image data and the determination table.

* * * * *